Jan. 19, 1960
D. M. PEMBERTON
2,921,781
SELECTIVELY VARIABLE PRESSURE APPARATUS FOR
YIELDABLY MAINTAINING RELATIVELY MOVABLE
MEMBERS IN SPACED APART RELATION
Filed Oct. 31, 1956
2 Sheets-Sheet 1
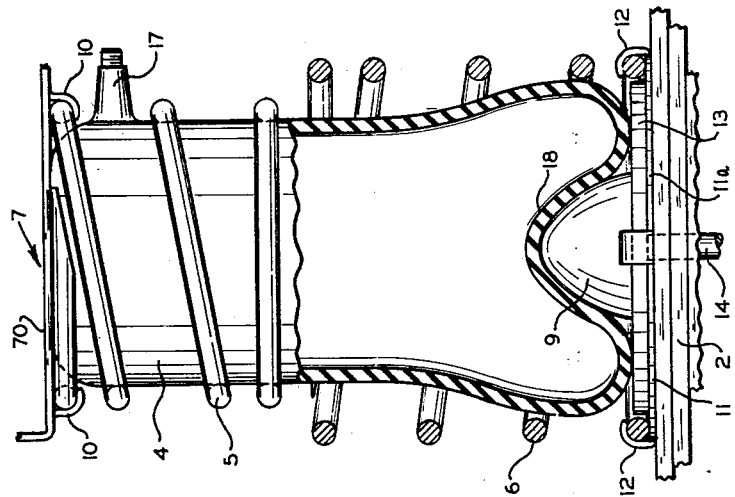
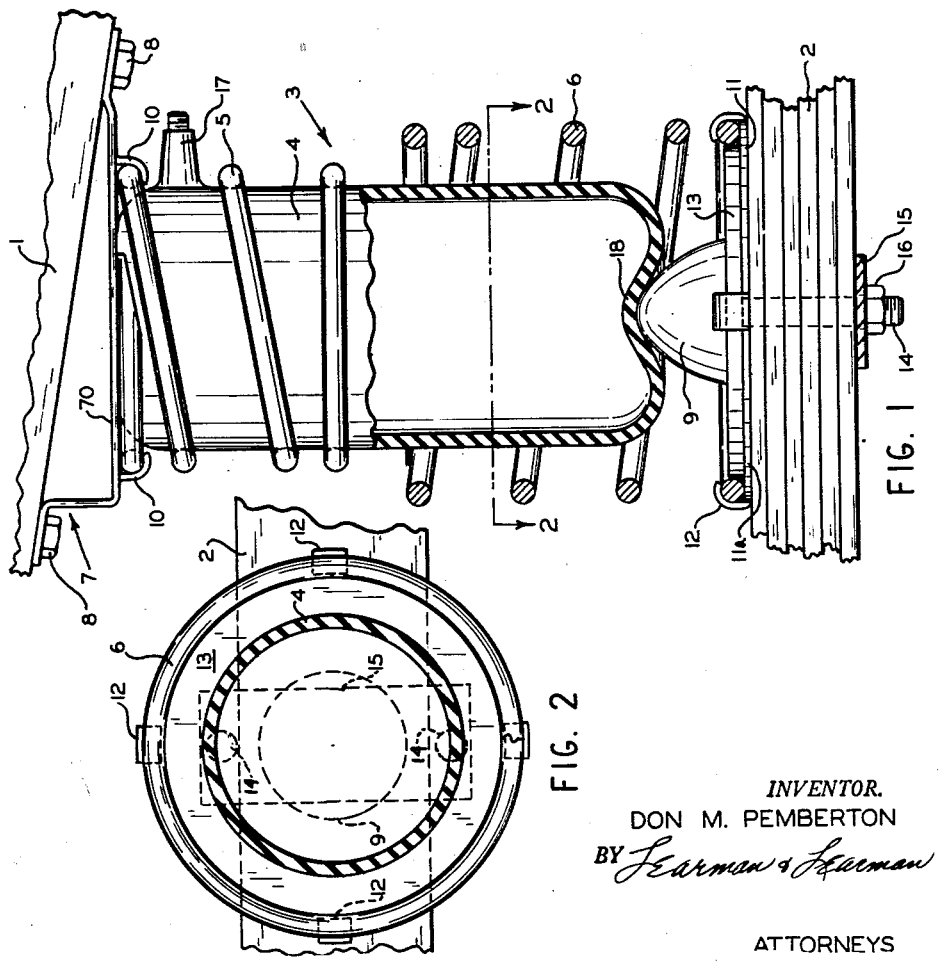
*INVENTOR.*
DON M. PEMBERTON
BY *Jearman & Jearman*
ATTORNEYS Jan. 19, 1960 D. M. PEMBERTON 2,921,781
SELECTIVELY VARIABLE PRESSURE APPARATUS FOR
YIELDABLY MAINTAINING RELATIVELY MOVABLE
MEMBERS IN SPACED APART RELATION
Filed Oct. 31, 1956 2 Sheets-Sheet 2

INVENTOR.
DON M. PEMBERTON
BY Learman + Learman

ATTORNEYS

United States Patent Office 2,921,781
Patented Jan. 19, 1960

2,921,781

SELECTIVELY VARIABLE PRESSURE APPARATUS FOR YIELDABLY MAINTAINING RELATIVELY MOVABLE MEMBERS IN SPACED APART RELATION

Don M. Pemberton, Lansing, Mich., assignor to Air Lift Company, Lansing, Mich., a corporation of Michigan Application October 31, 1956, Serial No. 619,594

10 Claims. (Cl. 267—34)

This invention relates to selectively variable pressure spring booster apparatus adapted for installation between a pair of spaced relatively movable members for yieldably maintaining the members in spaced apart relation. More particularly, this invention relates to apparatus of the kind referred to which is adapted to be used in conjunction with conventional spring suspensions of motor vehicles for augmenting the action of the latter when desired, but which may be so controlled as to influence the conventional suspension in accordance with necessity.

It is well-known that motor vehicle spring suspension systems have been so modified during recent years that an exceedingly "soft" ride is obtained when the vehicle is not overloaded. It also is well known that vehicle owners occasionally overload their vehicles, some doing so quite often. It is not uncommon for such a vehicle to "bottom" on a rough road, even when it is not overloaded and such action frequently occurs when the vehicle is even slightly overloaded. The bottoming of the vehicle is uncomfortable to the occupants, and the uncomfortable effect of the bottoming is enlarged by the rebound of the spring suspension. The discomfort experienced on a rough road in a vehicle which is not overloaded is magnified in a vehicle which is overloaded. Moreover, the likelihood of spring breakage or other damage to the vehicle is increased when the vehicle is overloaded.

The desirability of providing a booster for the spring suspension systems of motor vehicles has long been recognized and many proposals for overcoming the objectionable limitations of such suspension systems have been brought forward. Two of the most recent devices for providing auxiliary support for spring suspensions are disclosed in U.S. Patent No. 2,710,184 and in copending application Serial No. 513,370, filed June 6, 1955, now U.S. Patent No. 2,832,587, both of which are owned by the applicant's assignee. The desirable reasons for and results of providing auxiliary supporting means for spring suspensions are fully set forth in the patent and application referred to and will not be discussed in detail herein.

The instant invention is concerned not only with providing auxiliary support for the spring suspension of vehicles for overcoming the tendency of modern vehicles to "bottom" when even slightly overloaded, but also in minimizing the objectionable rebounding of the spring suspension, thereby increasing the supporting ability of the suspension, but not making the ride materially "stiffer" than it is when the vehicle is not overloaded. This characteristic of the invention is brought about by the addition to the spring suspension of an auxiliary unit which may or may not be anchored to the relatively movable parts of the suspension, as required by the loading condition of the vehicle. In any condition of loading, however, the auxiliary unit is in a position to assist the conventional suspension system in cushioning shocks incident to rough roads and may be so conditioned as to compensate for the load to be carried in the vehicle.

An object of the invention is to provide selectively variable pressure auxiliary supporting means for motor vehicle spring suspension systems which is operable to cushion severe shocks without otherwise materially varying the quality of the ride.

Another object of the invention is to provide apparatus of the kind referred to which is adjustable over a wide range so as to enable optimum results to be achieved irrespective of the loading condition of the vehicle.

A further object of the invention is to provide such apparatus which quickly and simply may be installed on motor vehicles without modification of the latter.

Other objects and advantages of the invention will be pointed out specifically or will become apparent in the following description when considered in conjunction with the appended claims and the accompanying drawings, in which:

Figure 1 is a fragmentary view, partly in elevation and partly in section, of apparatus constructed and installed in accordance with the invention and showing the positions of the parts under normal load;

Figure 2 is a sectional view taken on the line 2—2 of Figure 1;

Figure 3 is a view similar to Figure 1, but showing the parts under increased load;

Figure 4:
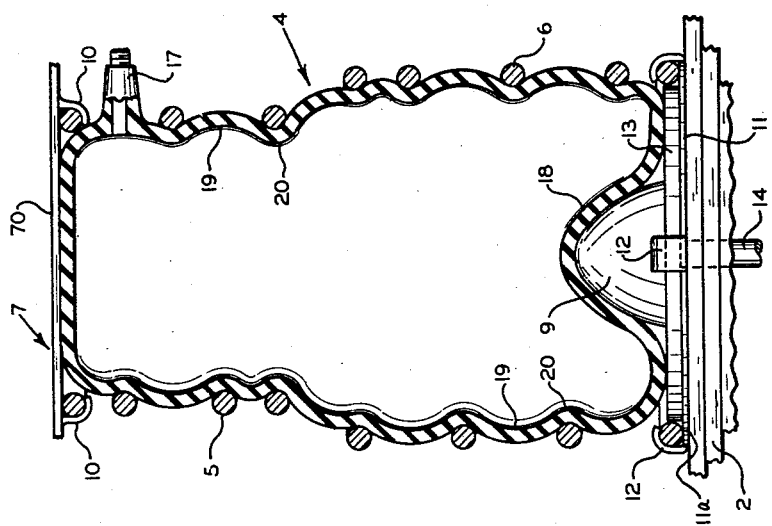
Figure 4 is a view similar to Figure 1 and showing the parts conditioned to withstand a considerably increased load.

In the embodiment of the invention disclosed in Figures 1-4, a pair of relatively movable members such as a motor vehicle body part 1 and a portion of the spring suspension, e.g., a leaf spring 2, normally connected one to another by suitable means (not shown) in a manner similar to that shown in Figure 3 or 4 of Patent No. 2,710,184. In modern motor vehicle constructions utilizing leaf springs such as shown at 2, the leaf spring constitutes the main or only spring support for one wheel of the vehicle, and the capacity of the spring is so selected that normal vehicle loads on fairly even surfaces will result in a "soft" or exceedingly smooth ride. It will be readily appreciated, however, that traveling over rough surfaces, with or without a heavy load, will result in jolts and jars which may not be wholly absorbed by the spring and its associated shock absorber. Moreover, it will readily be appreciated that the imposition of additional load on the vehicle will cause the spring to yield, thereby shortening the distance between the spring and the body part and requiring less vertical travel of the suspension parts to cause the vehicle to "bottom." To offset these characteristics of suspension systems, an auxiliary spring support or booster designated generally by the numeral 3 is provided to maintain the parts 1 and 2 in yieldable spaced apart relation.

The auxiliary spring booster 3 comprises a hollow, elastic, inflatable bag or envelope 4 of the kind disclosed in Patent No. 2,710,184; a pair of springs 5 and 6; brackets 7 and 11 for mounting the springs on different ones of the parts 1 and 2; and an envelope wall deforming part 9.

The bracket 7 is so shaped that, when it is secured to the member 1 by means such as bolts 8, it provides a substantially horizontal surface portion 70 from which clamping elements 10 are struck and shaped to grip the end convolution of the coil spring 5. The bracket 11 may comprise a disc 11a having a plurality of clamping elements 12, similar to the elements 10, extending therefrom and gripping the end convolution of the coil spring 6. Mounted on the disc 11a is a plate 13 on which is supported the parabola-shaped deforming member 9 formed of firm rubber or the like. The part 9 may be bonded or otherwise suitably secured to the plate 13, and the entire assembly of parts 6, 9, 11, and 13 is maintained in position on the member 2 by means of bolts 14 secured to the plate 13 and extending through openings in the disc 11a. The free ends of the bolts are threaded and may extend through openings formed in a strap 15 positioned beneath the member 2. Nuts 16 are used to clamp the assembly firmly to the member 2.

The auxiliary spring booster 3 is completed by positioning the envelope 4 within the convolutions of the two springs 5 and 6. The envelope may be so positioned when either the upper spring 5 is installed, or when the lower spring 6 is installed, or it may be so positioned after installation of the springs by jacking up the vehicle and inserting the envelope in deflated condition between the springs or between adjacent convolutions of one of the springs. In assembled condition of the parts, the upper spring 5 receives the upper portion of the envelope and the lower spring 6 receives the lower portion of the envelope.

As is best shown in Figures 1 and 3, the springs 5 and 6 are not connected to one another and the diameters of the springs are not the same. Preferably, the spring of smaller diameter is uppermost, as shown in the drawings, but the arrangement of the springs could be reversed. The diameter of the smaller diameter spring is so selected that it corresponds substantially to the outer diameter and shape of the envelope when the pressure within the latter is atmospheric. Thus, that portion of the envelope which is received within the smaller diameter spring will be gripped snugly by the convolutions of the spring in all conditions of loading of the latter.

The envelope 4 is provided with a Schrader type or other suitable valve which communicates with the interior of the envelope to enable the latter to be inflated and deflated. The position of the valve preferably is so located that it will be adjacent one end of the envelope and in the portion of the envelope which is received in the smaller diameter spring. This positioning of the valve will assure that the end of the valve projects sufficiently far beyond the outer diameter of the spring to enable an air hose to be connected to the valve with ease.

The diameter of the spring 6 is substantially larger than the diameter of the spring 5, as is shown in the drawings. The diameter of the spring 6 may be varied, but it should be so selected that when the envelope is at atmospheric pressure, there is no engagement between the spring convolutions and the side walls of the envelope for a purpose presently to be explained.

In conditioning the apparatus for operation, the parts may be arranged as shown in Figure 1, or an envelope of such length may be used that initially there is no contact between the end wall 18 of the envelope and the member 9. In either event, however, the envelope and the member 9 are so arranged that relative movement of the members 1 and 2 towards each other will effect engagement between the envelope wall 18 and the deforming part 9.

Assuming that the apparatus is arranged as shown in Figure 1 and that the envelope is inflated to approximately 6 p.s.i., such as would be the case when a vehicle having a normal load was being driven over relatively smooth surfaces, passage of the vehicle over railroad crossings or other mild rough spots will cause relative movement of the members towards one another, which relative movement will be cushioned in the usual manner by the leaf spring 2. The relative movement towards one another of the members 1 and 2, however, will cause deformation sharply inwardly of the wall 18 by the part 9, thereby tending to compress air within the cylinder 4. Since the lower portion of the envelope is not confined by the convolutions of the spring 6, and since the sidewalls of the envelope are readily yieldable, the deformation of the end wall 18 towards the opposite end wall will result in bellying outwardly of the lower portion of the envelope as is shown in Figure 3, and engagement of the end wall 18 with the plate 13 so as yieldably to resist relative movement of the members 1 and 2 towards each other. Since the lower portion of the envelope is unconfined by the spring 6, the assist that the spring 2 receives from the envelope in resisting movement towards one another will be quite "soft," thereby not appreciably stiffening the ride.

After the vehicle has passed over the rough spot, the spring 2 and the envelope will tend to restore the members 1 and 2 to their spaced apart relation. This action will taken place primarily under the influence of the spring 2, but will be gently assisted by the expansion of fluid within the envelope 4 and the tendency of the resilient side and end walls of the latter to resume their natural, cylindrical configuration. In most vehicles the rebound of the spring suspension will carry the parts beyond their normal spacing, reliance being placed on shock absorbers to snub vibration. The rebound characteristics of the spring suspension will not be increased by the apparatus 3 conditioned in the disclosed manner inasmuch as there is no connection between the springs 5 and 6. That is, the springs 5 and 6, being unconnected to each other, do not add appreciably to the rebound of the spring suspension. After the spring suspension has reached the limit of its rebound, however, and starts to move in the opposite direction, the envelope 4 will assist in snubbing vibration, thereby enhancing the riding qualities of the vehicle.

The above described action of the booster apparatus will occur when the envelope contains air at a pressure of about 6 p.s.i. The apparatus will function in an analogous manner, although to less degree, if the valve 17 is replaced by a small, free passage in a wall of the envelope. The small, free passage conveniently could be provided by removing the valve core from the valve 17.

The pressure within the envelope may be varied at will to compensate for the load to be carried by the vehicle. Figure 4 discloses the condition of the parts when the vehicle is heavily loaded and at rest. The parts are the same as has been described in conjunction with Figures 1–3, the only difference being that in Figure 4 the envelope is shown as being inflated to such an extent that the end wall 18 is deformed and the side walls are expanded to form undulating or alternating nodes 19 and roots 20, the roots receiving convolutions of the springs 5 and 6, and the nodes protruding a substantial distance between adjacent convolutions of the springs to interconnect the springs and provide yieldable supporting surfaces for the individual convolutions. The effect of inflating the envelope to such an extent as is shown in Figure 4 is yieldably to bind the two springs 5 and 6 together so that they function in much the same manner as would a single spring secured at its top and bottom to the members 1 and 2, respectively. Thus, in this arrangement, the spring suspension is reinforced by the pressurized envelope and by the springs 5 and 6 acting as one, and the individual convolutions of the springs are supported by the protruding nodes of the side walls. The action of the booster when conditioned as described with reference to Figure 4 will be similar to the action of the booster disclosed in Patent No. 2,710,184, but the yieldability of the instant booster assembly will be somewhat greater due to the deformation of the end wall 18.

The disclosed embodiment is representative of a presently preferred form of the invention, but the disclosure is intended to be illustrative rather than definitive of the invention. The invention is defined in the claims.

I claim:

1. Apparatus for yieldably maintaining a pair of relatively movable members in spaced apart relation comprising a hollow, elastic envelope having yieldable side walls; first yieldable means on one of said members having an opening of a shape and dimension snugly to receive a portion of said envelope therein; second yieldable means spaced from said first yieldable means on the other of said members having an opening of a shape and dimension loosely to receive another portion of said envelope therein; and means communicating with the interior of said envelope for inflating the latter to cause the yieldable side walls to expand and to engage forcibly both of said yieldable means, thereby interconnecting said first and second yieldable means.

2. Apparatus as set forth in claim 1 in which the yieldable means on said one of said members comprises a coil spring.

3. Apparatus set forth in claim 1 in which the yieldable means on each of said pair of members comprises a coil spring.

4. Apparatus as set forth in claim 3 in which said envelope is inflated to an extent such that said portions of the yieldable side walls within said coil springs assume an undulating configuration comprising alternating nodes and roots, said roots receiving convolutions of said springs and said nodes protruding a substantial distance between adjacent convolutions to provide yieldable supports for individual convolutions of said springs.

5. Apparatus for yieldably maintaining a pair of relatively movable members in spaced apart relation comprising a hollow, elastic envelope having yieldable side walls and at least one deformable end wall; first yieldable means on one of said members having an opening of a shape and dimension snugly to receive a portion of said envelope therein; second yieldable means spaced from said first yieldable means on the other of said members having an opening of a shape and dimension loosely to receive another portion of said envelope therein; deforming means mounted on said other of said members in a position to engage and deform sharply inwardly said deformable wall of said envelope upon relative movement of said members towards one another; and means in communication with the interior of said envelope for inflating the latter to effect, in cooperation with deformation inwardly of said deformable wall, expansion of said yieldable side walls so that said another portion of said envelope is snugly received in said second yieldable means on said other member.

6. Apparatus as set forth in claim 5 in which the yieldable means on said one of said members comprises a coil spring.

7. Apparatus set forth in claim 5 in which the yieldable means on each of said pair of members comprises a coil spring unconnected to one another except through the intermediary of said envelope when the latter is inflated to effect engagement of said another portion of said envelope with the coil spring on said other of said members.

8. Apparatus as set forth in claim 7 in which said envelope is inflated to an extent such that said portions of the yieldable side walls within said coil springs assume an undulating configuration comprising alternating nodes and roots, said roots receiving convolutions of said springs and said nodes protruding a substantial distance between adjacent convolutions to provide yieldable supports for individual convolutions of said springs.

9. Apparatus for yieldably maintaining a pair of relatively movable members in spaced apart relation comprising a first coil spring secured to one of said members; a second coil spring secured to the other of said members; an inflatable, elastic envelope having yieldable side walls received within the convolutions of each of said springs; and means communicating with the interior of said envelope for inflating said envelope to expand said side walls and cause portions of the latter to protrude between individual convolutions of each of said springs to interconnect said springs.

10. Apparatus as set forth in claim 9 in which said envelope has at least one deformable end wall and including a part shaped to deform said deformable wall sharply inwardly upon relative movement of said members towards one another.

References Cited in the file of this patent

UNITED STATES PATENTS

| 1,039,537 | Hofmann | Sept. 24, 1912 |
| 1,242,431 | Foster | Oct. 9, 1917 |
| 2,391,120 | Berthelmann | Dec. 18, 1945 |
| 2,676,794 | Griffith et al. | Apr. 27, 1954 |

FOREIGN PATENTS

| 5,252 | France | Dec. 2, 1905 |

(3rd addition to No. 338,539)